United States Patent
Santhanakrishnan et al.

(10) Patent No.: US 8,643,846 B2
(45) Date of Patent: Feb. 4, 2014

(54) METHOD AND APPARATUS FOR THE SIMULTANEOUS GENERATION AND DETECTION OF OPTICAL DIFFRACTION INTERFERENCE PATTERN ON A DETECTOR

(75) Inventors: Thankappan Santhanakrishnan, Kerala (IN); Tatavarti Venkata Sreerama Narasimha Rao, Kerala (IN)

(73) Assignee: Defence Research and Development Organisation, New Delhi (IN)

( * ) Notice: Subject to any disclaimer, the term of this patent is extended or adjusted under 35 U.S.C. 154(b) by 801 days.

(21) Appl. No.: 12/668,432

(22) PCT Filed: Jul. 10, 2008

(86) PCT No.: PCT/IN2008/000444
§ 371 (c)(1),
(2), (4) Date: Aug. 27, 2010

(87) PCT Pub. No.: WO2009/008010
PCT Pub. Date: Jan. 15, 2009

(65) Prior Publication Data
US 2010/0321698 A1 Dec. 23, 2010

(30) Foreign Application Priority Data
Jul. 12, 2007 (IN) .......................... 1469/DEL/2007

(51) Int. Cl.
*G01B 11/02* (2006.01)

(52) U.S. Cl.
USPC .......................................... 356/502; 356/499

(58) Field of Classification Search
USPC ................. 356/35.5, 499, 502, 521
See application file for complete search history.

(56) References Cited

U.S. PATENT DOCUMENTS

| | | | | |
|---|---|---|---|---|
| 3,286,032 A * | 11/1966 | Baum | ........................... | 381/172 |
| 3,700,903 A | 10/1972 | Adler et al. | | |
| 5,262,884 A * | 11/1993 | Buchholz | ....................... | 398/134 |
| 5,995,260 A * | 11/1999 | Rabe | ............................. | 398/115 |
| 6,055,080 A * | 4/2000 | Furstenau et al. | ............. | 398/139 |
| 7,088,455 B1 * | 8/2006 | Kirkpatrick et al. | ........... | 356/502 |
| 7,293,463 B2 * | 11/2007 | Suzuki et al. | ................... | 73/655 |
| 7,372,771 B2 * | 5/2008 | Park | ................................ | 367/99 |
| 7,957,006 B2 * | 6/2011 | Aharoni | ......................... | 356/502 |

FOREIGN PATENT DOCUMENTS

| | | |
|---|---|---|
| JP | 2004-117317 | 4/2004 |
| WO | 02/35194 | 5/2002 |

OTHER PUBLICATIONS

English abstract of JP 2004 117137 A, published on Apr. 15, 2004.

* cited by examiner

*Primary Examiner* — Michael A Lyons
(74) *Attorney, Agent, or Firm* — Ladas & Parry LLP

(57) ABSTRACT

The present invention provides for a novel method and apparatus for the simultaneous generation and detection of optical diffraction interference pattern on a photo detector. The monitoring method and apparatus disclosed herein comprises of a (any) continuous wave coherent collimated beam of light (or a laser) falling on an (any) optically reflective coating on the surface of the body with inherent vibrations, or with manifest vibrations induced from another source through any medium where the said light is reflected, and then received on the surface of a (any) photo detector in such a way that the received light falls partially on the active sensing area, and partially on the outer perimeter of the active sensing area.

15 Claims, 6 Drawing Sheets

Prior Art

Schematic drawing explaining the optical diffraction phenomena by a straight edge obstruction

METHOD AND APPARATUS FOR THE SIMULTANEOUS GENERATION AND DETECTION OF OPTICAL DIFFRACTION INTERFERENCE PATTERN ON A DETECTOR

FIELD OF INVENTION

The present invention relates to the field of opto-electronics, specifically to the area concerned with optical techniques for vibration monitoring. The present invention also relates to the field of opto-electronic devices for monitoring remote sound, and/or mechanical vibrations. The present invention more particularly provides an innovative method and apparatus for the simultaneous generation and detection of optical diffraction interference pattern on a photo detector.

BACKGROUND AND PRIOR ART OF THE INVENTION

There are several optical methods that can be used for detection of sound from a distance; the most commonly used being the technique which employs the concept of Optical interferometer, which is well known in the field of electro-optics. The technique involves a high powered coherent light source, like a laser; good quality optical accessories, like beam splitters, mirrors, collimating lenses etc.; and a photo detector. Although, the use of a laser to transduce sound from one place to another is well realized in controlled laboratory conditions, the standard existing interferometer techniques have many limitations if one were to adapt for real world practical applications.

Most of the devices which utilize optics as a means for monitoring acoustic vibrations, work on the well-known principle of Michelson's interferometer, which requires a sufficiently high powered coherent light (laser) source where the object and reference light beams need to be precisely aligned and only 25% of the intensity of light used reaches the detector plane where fringes or images form. In brief, two aligned beams of laser light, of which one beam is slightly delayed in relation to the other beam of same frequency, will cause the two beams to reinforce each other if they are in same phase or cancel each other if one beam is 180° out of phase. If one of the two beams is reflected by an object in motion such that the direction of motion is generally in the same direction as the non-reflected stationary beam, and the two beams are aligned by means of suitable mirrors into a single beam, the resulting interference pattern will move at a velocity that is twice the velocity of the moving object along the axis of the aligned beam. As the interference pattern moves in the direction of the aligned beam, a light sensor placed in the path of the beam will sense light intensity variations that vary as a function of the movements of the reflecting object. The interference caused by the beams of light has been used by inventors to construct microphones that are very sensitive and have other qualities. (U.S. Pat. No. 3,470,329 by N. O. Young, Sep. 30, 1969, entitled 'Interferometer microphone'; U.S. Pat. No. 1,709,762 by V. K. Zworykin, Apr. 16, 1929, entitled 'Interferometer microphone'; U.S. Pat. No. 4,479,265 by R. P. Muscatell, Oct. 23, 1984, entitled 'Laser microphone'; U.S. Pat. No. 6,590,661 by J. M. Shnier, Jul. 8, 2003, entitled 'Optical Methods for selectively sensing remote vocal sound waves').

However, any quality difference in terms of aberrations, astigmatism, coma and distortion etc., results in substantial increase in the noise in the interference fringes produced at the detector plane thus affecting the practical realization of the technique for many applications. Ideally both legs of an interferometer should be of equal length. If the two jointly arriving beams are not phase synchronized, the constructive and destructive interference is degraded, thus limiting the device's sensitivity. Moreover, one of the practical problems in the techniques of the prior art is that the large optical path lengths involved in real world applications, make it extremely difficult to maintain equal path lengths for the interferometer.

FIG. 1 schematically illustrates the concept of generating an optical diffraction pattern [5] for monochromatic light, by a prior art optical diffraction method. One means of producing such a pattern is through the use of a plane wave [1] from a laser and an opaque object [2]. According to the established theories of optics, the sharp edge of the object [2] casts a shadow having a fairly sharp outline of the same shape as the object. However, the edge of this geometric shadow is not absolutely sharp and when examined closely it shows a system of dark and bright bands in the immediate neighbourhood of the edge at a point [4]. The system of dark and bright bands comprises a diffraction pattern in a small region around the point [4]. The resulting diffraction pattern [5], on a screen [3], is typically shown for the purpose of illustration. This pattern is due to the diffraction of light around the edge of the object [2] and a result of interference between the direct and the diffracted light rays. The diffraction pattern is well known as the Fresnel diffraction pattern.

The concept of optical diffraction is not new; however the technique could not find as many applications as the technique of interferometer did, in the field of vibration monitoring due to the practical limitations involved in its implementation. Generally, devices based on optical diffraction require an optically opaque object to bend a part of the laser beam and need a separate recording setup for recording the diffraction pattern for analysis. Because of the high sensitivities involved in generating optical diffraction patterns, even laboratory experiments under controlled conditions fail to yield high repeatability, if utmost case is not taken to meet the various criteria necessary to yield a diffraction pattern. And in the real world conditions the efficacy of this technique becomes doubtful where the environmental conditions also keep changing. Therefore, there exists a need for new devices which employ simpler but effective methods for generation and detection of optical diffraction pattern that would function with good repeatability and durability even under changing environmental conditions.

The present invention is a new method for simultaneously generating and detecting the Fresnel diffraction pattern, as disclosed in the description. The new method of the invention can be easily adopted in making novel devices to monitor mechanical or pressure vibrations remotely; using any standard laser source and photo detector, one such example being the optical microphone for remotely detecting sound.

The present invention provides for methods and apparatus for sensing any vibrations, including sound waves; and in particular using optical means to detect any mechanical vibrations through certain corresponding changes in optical properties of air or through other optically transparent or semitransparent medium through which the mechanical vibrations, including sound waves, propagate. The present invention generally relates to the use of the principle of optical diffraction and interference.

OBJECTS OF THE INVENTION

The primary object of the invention is to provide novel method and apparatus for the simultaneous generation and detection of optical diffraction interference pattern on a detector.

Another object of the invention is to provide for a novel method and apparatus for remotely monitoring all mechanical vibrations.

Yet another object of the present invention is to provide for a method and apparatus to work as an optical microphone which is operable over the entire range of acoustical frequencies.

An additional object of the present invention is to provide for an optical microphone which uses optical diffraction and generates different spatial light intensity distributions on the photodetector active area.

Yet another object of the present invention is to provide for a method for simultaneous generation and detection of optical diffraction pattern using a single standard photo detector.

Still another object of the present invention is to provide for a non-contact apparatus for measuring position displacements of objects.

An additional object of the present invention is to provide for a non-contact apparatus for monitoring vibrations of objects.

Yet another object of the present invention is to provide for an apparatus for underwater acoustic detection.

Still another object of the present invention is to provide for an apparatus to work as an optical hydrophone.

Yet another object of the present invention is to provide for an apparatus for transduction of sound, and or vibrations into light.

A further object of the present invention is to provide for an apparatus for remotely detecting sound from outside, when the said sound is produced in a room with an optical reflecting outer surface.

Another object of the present invention is to provide for an apparatus for detection of hydrodynamic disturbances in the ocean.

Yet another object of the present invention is to provide for an apparatus for gravitational wave detection in the atmosphere.

Still another object of the present invention is to provide for an apparatus for detecting pressure vibrations in any optically transparent medium.

A further object of the present invention is to provide for an apparatus for optical fencing.

Another object of the invention is to provide for a simple and portable apparatus for survivor detection from inaccessible rubbles caused by natural calamities.

Yet another object of the present invention is to provide for a simple and portable apparatus for listening to sounds emanating from distant locations.

Still another object of the present invention is to provide a simple and portable apparatus for use as a microphone with high fidelity to reproduce sound in theaters, recording studios and auditoriums.

SUMMARY OF THE INVENTION

Accordingly, the present invention relates to a novel method and apparatus for the simultaneous generation and detection of optical diffraction interference pattern on a photo detector.

The present invention relates to an apparatus for the simultaneous generation and detection of optical diffraction interference pattern on a detector comprising:
  a continuous wave coherent collimated beam of light (or a laser) source [1];
  an optically reflecting surface [6];
  a photo detector [8] wherein the said photo detector comprises an inner active sensitive area [10] and an opaque annular ring in the outer rim [9].

In a preferred embodiment of the invention, the apparatus comprises an analogue to digital conversion circuitry [16] connected to the said photo detector [8].

In accordance with the embodiments of the invention, the apparatus is selected from vibration monitoring device and optical microphone.

In another embodiment of the invention, the said laser source [1] is a low power diode laser operating in the visible region of the spectrum at 635 mm comprising a 4 mw power output. However, the said method works as well with any laser light sources having any output power and wavelength, and suitable photo detectors.

In yet another embodiment of the invention, the said optically reflecting surface [6] is pasted on the diaphragm of a loudspeaker [7].

In yet another embodiment of the invention, the said photo detector [8] is a standard solid state silicon photo detector, having a circular active sensing diameter of 10 mm [10].

In yet another embodiment of the invention, the said photo detector has an embedded BNC connector for providing electrical output.

The present invention also relates to a method for the simultaneous generation and detection of optical diffraction pattern on a detector comprising the steps of:
(a) illuminating an optical reflector undergoing inherent/induced vibrations with a continuous wave coherent collimated beam of light (or a laser) emitted from a monochromatic light source [1];
(b) receiving/aligning the light reflected from the optical reflector [6] of step (a) on the surface of a photo detector [8] to generate a photoelectric signal;
(c) the said photoelectric signal of step (b) is transmitted to an analogue to digital conversion circuitry [16] as an input signal.

In a preferred embodiment of the invention, the said photo detector is arranged in a configuration so that the said reflected light beam is made to fall partially on the active sensing area [10], of the photo detector, and partially on the outer perimeter [9] of the active sensing area.

In a further embodiment of the invention, a standard test and measurements apparatus [14] comprising analogue to digital conversion circuitry is connected to a computer [18], another standard test and measurements apparatus [16] comprising analogue to digital conversion circuitry is connected to the said computer [18] and/or a combination thereof.

In another embodiment of the invention, the said inherent/induced vibrations introduced to the optical reflecting surface are reproduced from the output signals emanating from the photo detector.

In yet another embodiment of the invention, the laser light modulations are converted into electrical modulation at the photo detector.

In still another embodiment of the invention, the said modulated electrical signal is converted back to acoustical signal by the second loud speaker.

DETAILED DESCRIPTION OF THE INVENTION

The present invention describes an innovative method and apparatus for the simultaneous generation and detection of optical diffraction interference pattern on a photo detector. The novel method is applied to monitor the vibrations generated on a speaker by a streaming audio signal. A comparison of the records of the vibrations generated and the records of the vibrations monitored using this method (FIG. 6), demonstrates the efficacy of this method as a vibration monitoring device.

The vibration monitoring device disclosed herein comprises of a (any) continuous wave coherent collimated beam of light (or a laser) falling on an (any) optically reflective coating on the surface of the body with inherent vibrations, or with manifest vibrations induced from another source through any medium where the said light is reflected, and then received on the surface of a (any) photo detector in such a way that the received light falls partially on the active sensing area, and partially on the outer perimeter of the active sensing area (annular ring surrounding the perimeter of the active sensing area) of the said photo detector.

The spatial intensity pattern produced on the photo detector due to the interference between the directly incident light and the optically diffracted light, changes, if the incident light emanating from the reflecting surface undergoes changes in its path length as a result of the vibrations felt on the reflecting surface. The photo detector records the precise time varying optical diffraction interference pattern, corresponding to the time varying vibrations experienced by the optical reflector.

Figure 2:
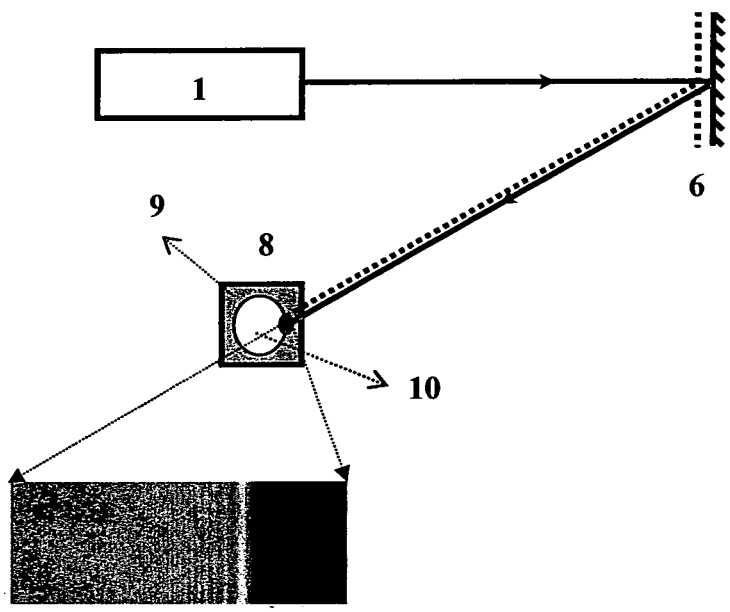
FIG. 2 is a schematic illustration of the novel method of the invention for simultaneously generating and detecting the optical diffraction pattern. It shows how an optical diffraction pattern is generated by the light beam, reflected from a vibrating surface, and falling partially on a photo detector's sensing area and partially on the annular ring surrounding the perimeter of the sensing area of the photo detector, thus enabling the detection of the optical diffraction pattern and hence the vibrations on the reflecting surface.

FIG. 2 shows a schematic view of the main components of an apparatus for employing the novel method for simultaneous generation and detection of optical diffraction pattern using a standard photo detector. Unprocessed raw point light beam emitted from a coherent monochromatic light source [1] of any constant intensity (a laser diode source is chosen in the working example, whose DC electrical supply for powering the laser diode is not shown here), is illuminated on an optical reflector [6] experiencing inherent vibrations and, or those induced by a vibrating body. The said reflected raw laser beam upon reflection by the optically reflecting surface is received on a standard photo detector [8]. The schematic configuration is organized in such a way that the reflected light beam is received at the edge of the photo detector's active sending area, so that part of the light directly falls on the inner perimeter of the photo detector's active area [10], and the other part falls on the outer perimeter of the opaque region [9], which is generally of the order of a micron thick, of the photo detector.

When a beam of light passes though a narrow slit, or the edge of any opaque object, it spreads out to a certain extent into the region of the geometrical shadow. This effect can be explained by the well established concept of optical diffraction using the fundamental principles of wave motion. Diffraction phenomena is conveniently categorized as two classes: (i) those in which the source of light and the screen on which the diffraction pattern is observed are effectively at infinite distances from the aperture or object causing diffraction, and, (ii) those in which either the source or the screen, or both, are at finite distances from the aperture, or the object causing diffraction. The phenomena coming under class (i) are called Fraunhofer diffraction, and those under class (ii) are called Fresnel diffraction. Fraunhofer diffraction is much simpler to treat theoretically, although a system of lenses and other accessories are required to observe the phenomena in the real world. Fresnel diffraction although simpler to observe (other accessories are required even though no lenses are necessary), involves a rigorous theoretical treatment which is more complex than Fraunhofer diffraction.

The uniqueness and novelty of this invention is the generation of a Fresnel diffraction pattern (without using any other optical accessories as is generally done), and additionally, the simultaneous detection of the Fresnel diffraction pattern using a standard photo detector. In the method of the invention the outer opaque region of the photo detector functions as an obstruction to a portion of the light beam and therefore forces the light rays to diffract and consequently enable interference with the directly incident portion of the light beam falling on the active sensing area of the photo detector.

According to the principles of Fresnel diffraction (F. Pedrotti and L. Pedrotti, *Introduction to Optics, 2$^{nd}$ edition*, Prentice Hall, New Jersey, 1993, p. 370), a diffraction pattern comprising of alternate zones of bright and dark bands of light separated by a phase difference of $\lambda/2$ ($\lambda$ being the wavelength of light used) will be formed such that the phase of each successive band is opposite to the one preceding it. The horizontal fringe spacing, b, is known to be given by the relation, $b=\sqrt{nd\lambda}$, where n is the fringe number, d is the distance of separation between the optical obstruction (the annular ring on the outer region and the photo detector, where the fringes are formed due to Fresnel diffraction caused by, e.g. a straight edge. The larger the separation of the reflecting surface from the detector, the lower will be the amplitude of the light intensity falling on the detector. It is also established that the amplitude $A_n$ of the light intensity at any point resulting from n zones, each contributing $a_i$ (subscript "i" being the fringe number), can be approximated by $A_n=(a_1-a_n)/2$, when n is even; and $A_n=(a_1+a_n)/2$, when n is odd. In addition the amplitude of the light intensity is also a function of the obliquity of the beam falling on the detector, $a=a_0(1+\cos\theta)$, where $\theta$ is the vertical angel of the incidence of the beam with respect to the detector. It is established that if n is very large (that is the number of Fresnel zones is very large) then the amplitude of the $n^{th}$ zone, $a_n$ goes to zero. Therefore, if the pattern is larger than the detector area then the $n^{th}$ zone may not be falling on the detector, which means at any point the amplitude is given by a/2. It is also apparent for experts in the field that the number of fringes possible on the surface of the photo detector is very high.

When the path lengths of the light rays (directly falling and the diffracted rays) are changing continuously as a result of the vibrations on the reflecting surface, then the diffraction interference pattern also continuously keeps changing with the amplitude and the frequency of the vibrations, manifesting on the diffraction pattern. A photo detector can therefore, detect this diffraction pattern as voltage or current variations corresponding to the light intensity variations falling on the active sensing area. Thus a continuous monitoring of the said diffraction interference pattern by a photo detector enables one to determine the amplitudes and frequencies of vibrations over all ranges by employing standard Fourier transform methods which are well known to experts in the field.

Figure 1:
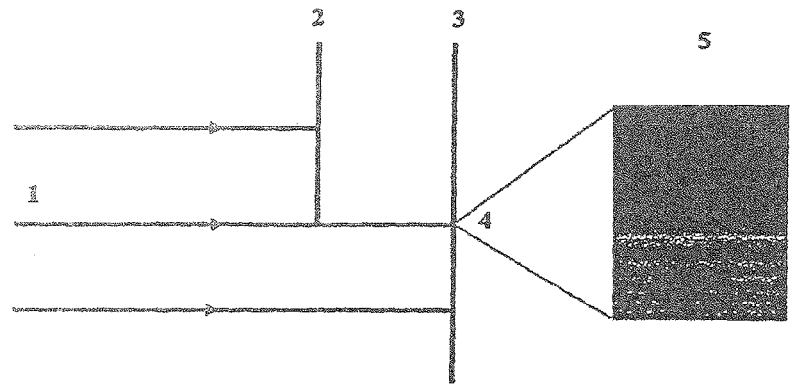
FIG. 1 is a schematic illustration of prior art method for producing diffraction pattern of a light beam.

The prior art method as depicted in FIG. 1 has many shortcomings as hereinbefore described. The novel method of the present invention overcomes shortcomings found in the prior art. In the present invention the novel method of receiving diffracted light on the photo detector circumvents the necessity of a screen ([3] of FIG. 1) and also incorporates an innovative method of avoiding the necessity of the opaque object ([2] of FIG. 1) in front of the photo detector. Upon reception of the said light beam on the photo detector's regions as mentioned, diffraction occurs and interference between the direct ray and the diffracted ray of the light beam generates a Fresnel diffraction pattern on the photo detector. The photoelectric signal generated on the photo detector due to the diffraction interference pattern is transmitted via cable ([11] of FIGS. 3 and 5) to any standard output device like another loudspeaker ([12] of FIG. 4) 12 or any standard analogue data recording system or any other test and measurement apparatus ([16] of FIGS. 3 and 4).

The following examples and experiments are provided to illustrate the invention in detail and are not construed to limit the scope of the invention.

Example 1

FIG. 2 shows a schematic arrangement of the main components of an apparatus for simultaneous generation and detection of optical diffraction pattern using a standard photo detector. Unprocessed raw point light beam emitted from a coherent monochromatic light source [1] of any constant intensity (a laser diode source is chosen in the working example, whose DC electrical supply for powering the laser diode is not shown here), is illuminated on an optical reflector [6] experiencing inherent vibrations and, or those induced by a vibrating body. The said reflected raw laser beam upon reflection by the optically reflecting surface is received on a standard photo detector [8]. The schematic configuration is organized in such a way that the reflected light beam is received at the edge of the photo detector's active sending area, so that part of the light directly falls on the inner perimeter of the photo detector's active area [10], and the other part falls on the outer perimeter of the opaque region [9], which is generally of the order of a micron thick, of the photo detector.

Example 2

Figure 3:
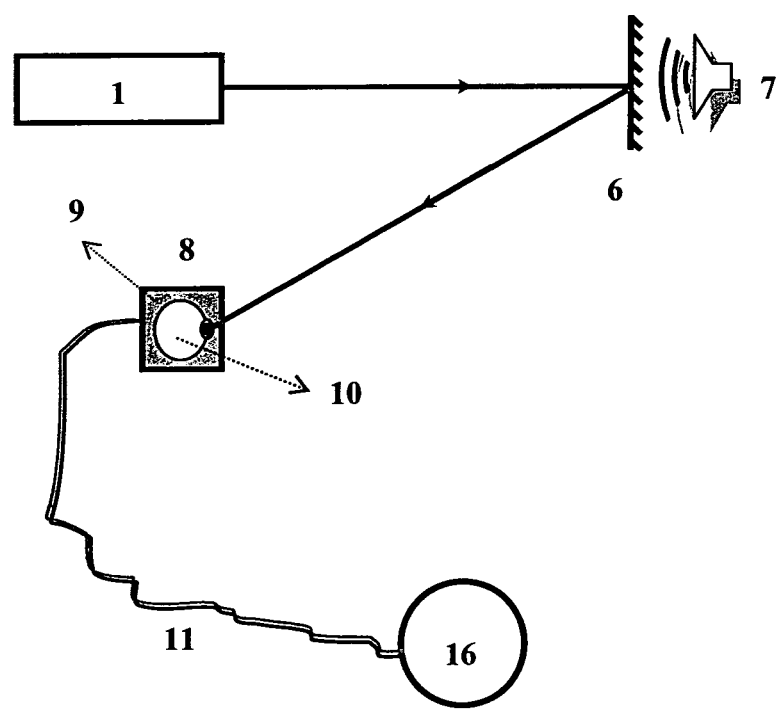
FIG. 3 is a schematic illustration of an apparatus for monitoring remote vibrations or sound (as in an optical microphone) and means for producing and recording the optical diffraction pattern caused by the vibrations.

FIG. 3 shows a schematic configuration of an apparatus for vibration monitoring. In this working example a tiny mirror is chosen as the optical reflector which is mounted on, the central diaphragm of a laboratory loudspeaker [7]. The diaphragm of the loud speaker represents the vibrating body as the known signals emanating from a signal connected to a computer, are piped on to the laboratory speaker; thus making the diaphragm on the loud speaker to vibrate in relation to the known signals being input. The time varying continuous vibrations introduced at the tiny mirror [6] pasted on the diaphragm of the speaker, introduces corresponding changes in optical path lengths of the light (direct and the diffracted) rays. Therefore, the intensity of diffraction pattern generated on the photo detector [8] gets modulated at the rate (amplitude and frequency) of vibration. Photo detector [8] detects these vibrations as voltage variations corresponding to the light intensity variations falling on the photo detector. As a result, the vibration amplitudes and frequencies are monitored by the photo detector.

The diaphragm of a loud speaker [7] is made to vibrate by giving known input signals from a signal generator (which is not shown in the figure). Depending upon the frequency of the input signal and its amplitude, the loud speaker's diaphragm vibrates. An unprocessed, raw laser beam from a laser diode [1] is made to fall on an optically reflecting surface [6], pasted on to the diaphragm of the loud speaker [7]. A photo detector [8] is arranged in such a configuration that the reflected laser beam is made to fall partially on the active sensing area [10], of the photo detector, and partially on the outer perimeter [9], of the active sensing area of the photo detector. When the loud speaker's diaphragm vibrates, the path length of the laser beam increases or decreases, depending on whether the diaphragm is moving away from or towards the photo detector respectively.

Figure 5:
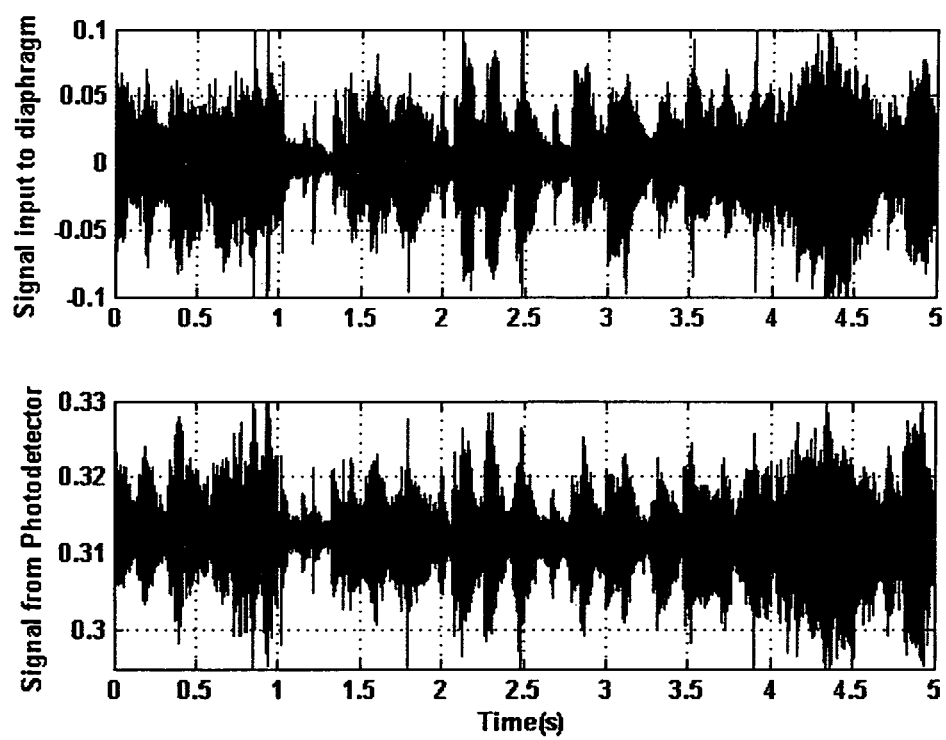
FIG. 5 shows typical plots of time series of input vibrations introduced and time series of signals detected by a photo detector using the method of the invention.

It is observed using a standard test and measurement apparatus [16] which is connected to the photo detector [8] through appropriate standard cable [11], that the photo detector reproduces the signals introduced into the diaphragm. A time series plot of the intensity of signal input (obtained from the signal file played on a personal computer and piped though to the loud speaker so that the diaphragm of the loud speaker vibrates correspondingly) and a time series plot of the output signals obtained from the photo detector are shown in FIG. 5. As elucidated in FIG. 5, the output photo detector signals are a very good reproduction of the input audio signals. The output power, frequency, output irradiance profile and the diameter of the laser beam to be employed; the type and size of photo detector; the analogue data acquisition and processing circuitry to be connected to the output of the photo detector; the specific distance of separation between the laser diode and the reflecting surface mounted or attached on the object whose vibrations are to be monitored; and the distance of separation between the reflecting surface and the photo detector may vary on the specific functional requirements of vibration monitoring.

Example 3

Figure 4:
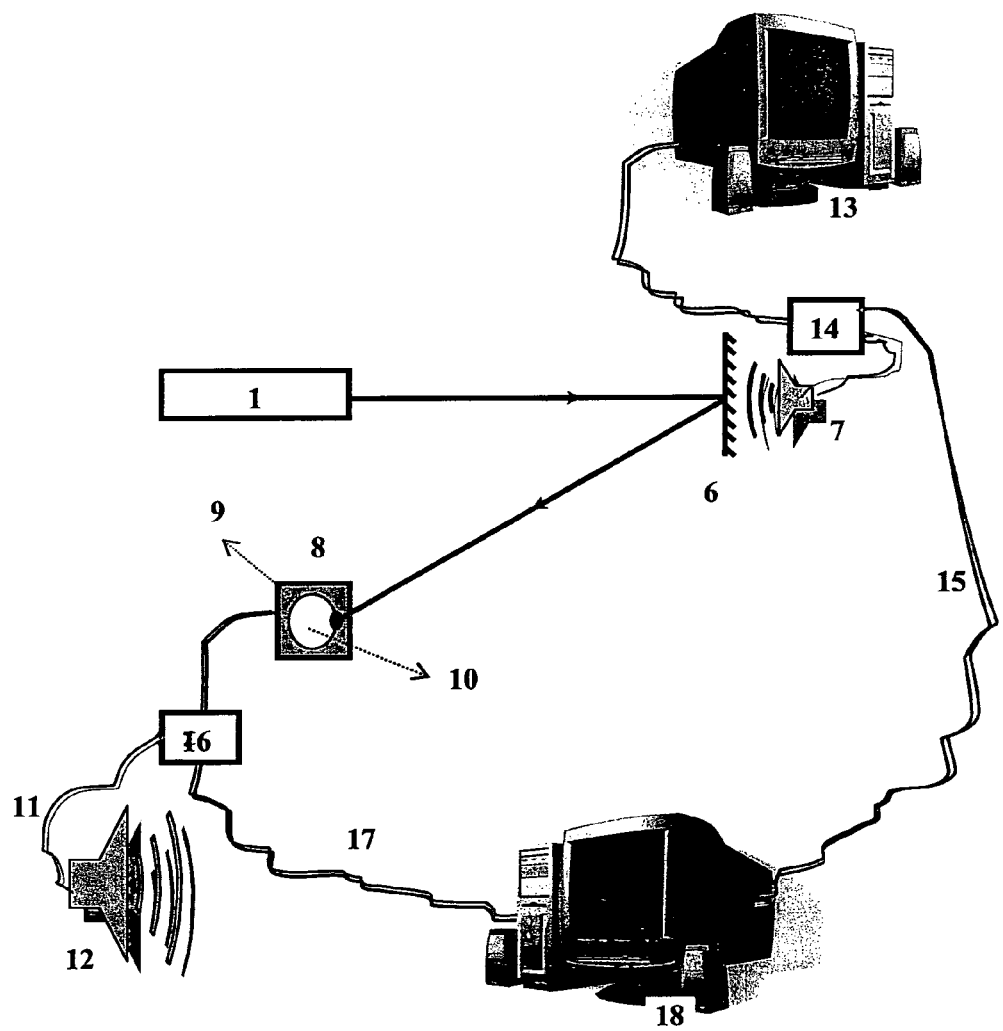
FIG. 4 is a schematic illustration of the set up for demonstration of the efficacy of the new method being claimed for use an optical microphone.

FIG. 4 shows a schematic configuration of an apparatus which is used as an optical microphone. In this working example, a known audio file having a range of audio frequencies (600 Hz to 4000 Hz) is played on the first loud speaker [7]. It is observed that the second loudspeaker [12] connected to the photo detector [8] through a standard cable [11] reproduces the same music exactly in live.

The vibration introduced at the mirror [6], which is pasted on to the diaphragm of the loud speaker [7] introduces continuous change in optical path lengths of the reflected beam. This results in varying diffraction patterns on the photo detector. That is, the intensity of diffraction pattern generated on the photo detector [8] gets modulated by the amplitude and change of period of vibrations. Photo detector [8] detects these vibrations as corresponding voltage variations. Hence, the vibration amplitudes and frequencies can be reproduced. This indicates that, instead of loudspeaker [7], if an external sound produced elsewhere or near, vibrates the mirror [6] then it is possible to detect that sound or vibration using the same concept described above, and hence the embodiment under discussion would work as an optical microphone.

The input audio file being played by a personal computer [13] is tapped by a standard test and measurements apparatus [14], comprising of analogue to digital conversion circuitry and piped on to another personal computer [18], through a standard cable [15]. The output from the photo detector [8], is similarly tapped by the standard test and measurement apparatus [16], comprising of an analogue to digital conversion circuitry, the signals from which are piped through a standard cable [17] to the personal computer [18]. However, instead of two separate apparatus a single test and measuring apparatus comprising of a multi-channel analogue to digital conversion circuitry may also be used.

Figure 6:
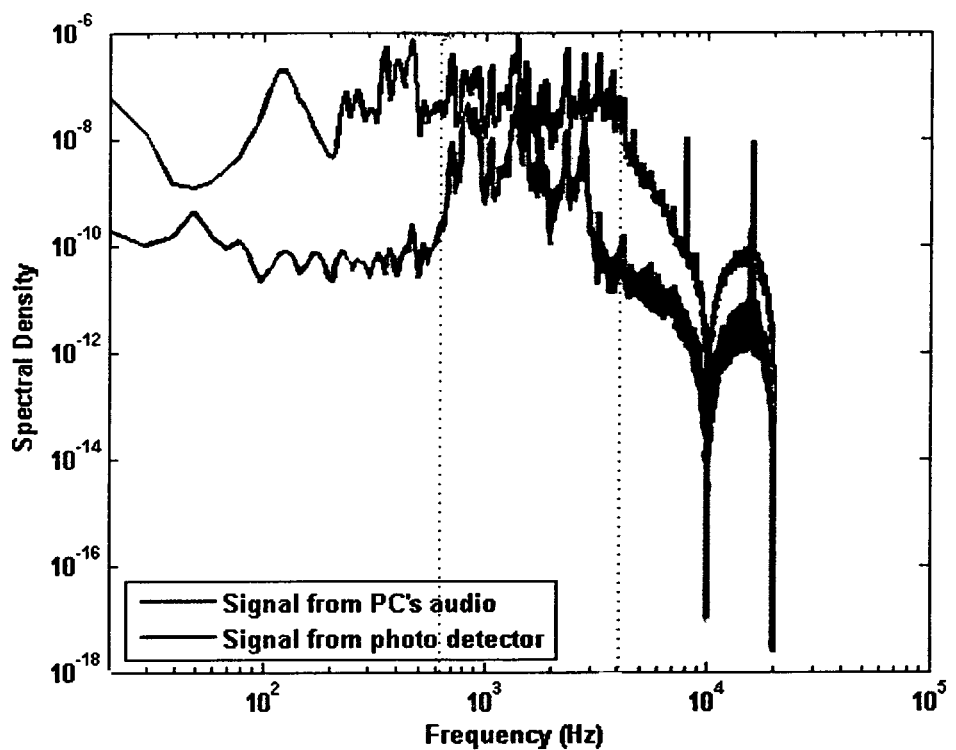
FIG. 6 shows plots of spectra of input vibrations introduced and output vibrations monitored along with the spectral coherence between input vibrations introduced, and the output vibrations monitored using the new method under claim.
Figure 6:
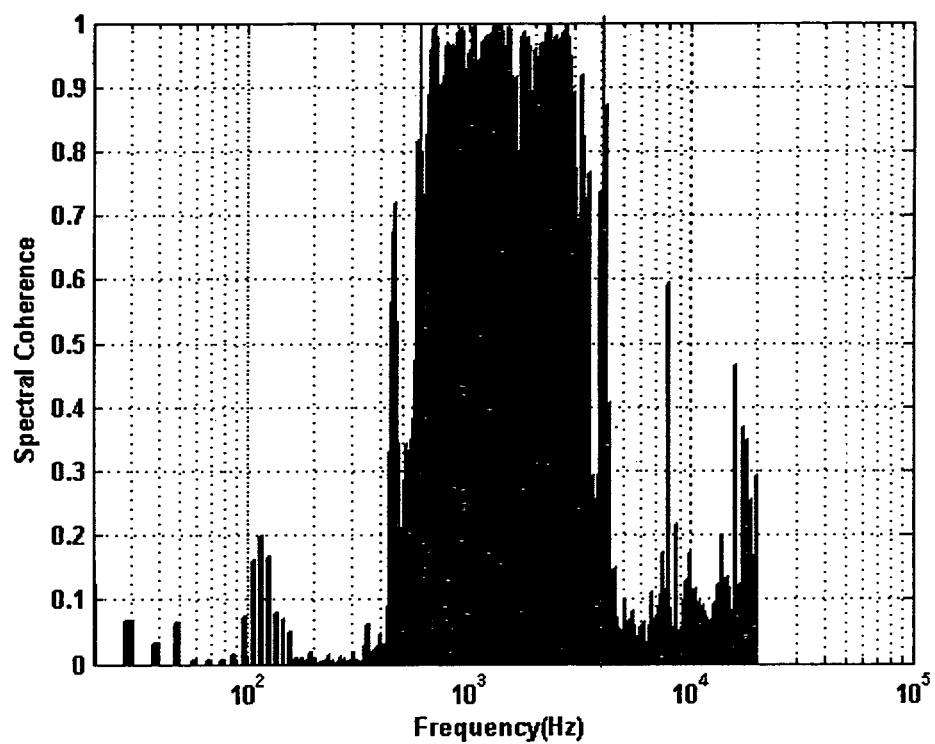

FIG. 6 shows the input audio signal spectra and the output photo detector signal spectra along with the spectral coherence plot between the input and the output. As depicted in FIG. 6 the reproduction of the audio signal input by the photo detector output signal is very good with excellent coherence, in the audio range input (600 Hz-4000 Hz). The other spectral frequencies in the figure were confirmed to be due to the audio harmonics, characteristics of the loud speaker, and other vibratory signals emanating from extraneous sources in the laboratory set up used for demonstration of the working example. This working example therefore demonstrates how the present embodiment of the invention effectively functions as an optical microphone.

We claim:

1. An optical microphone for the detection of vibrations, the optical microphone comprising:
   a continuous wave coherent collimated beam of light source [1];
   an optically reflecting surface [6]; a photo detector [8]; and a loudspeaker [12];
   wherein the light source illuminates the beam on the reflecting surface experiencing the vibrations and the reflecting surface reflects the beam to the photo detector and the photo detector comprises an inner active sensing area [10] and an opaque annular ring in the outer rim [9] and detects the vibrations by generation of a diffraction pattern as corresponding voltage variations, and the loudspeaker is connected to the photo detector and reproduces the vibration amplitudes and frequencies.

2. The optical microphone as claimed in claim 1, wherein the inner active sensing area of the photo detector [8] is connected to circuitry [16] that converts analogue signal to digital signal.

3. The optical microphone as claimed in claim 1, wherein the light source is laser source [1] which is a low power diode laser operating in the visible region of the spectrum at 635 nm comprising a 4 mw power output.

4. The optical microphone as claimed in claim 1, wherein the optically reflecting surface [6] is pasted on diaphragm of a loudspeaker [7].

5. The optical microphone as claimed in claim 1, wherein the photo detector [8] is a standard solid state silicon photo detector, having a circular active sensing diameter of 10 mm [10].

6. The optical microphone as claimed in claim 1, wherein the photo detector has an embedded BNC connector for providing electrical output.

7. The optical microphone as claimed in claim 1, wherein the vibrations which the reflecting surface experiences are sound vibrations.

8. A method for detecting vibrations by operation of an optical diffraction pattern, wherein the method comprises the steps of:
   (a) illuminating an optical reflector [6] undergoing induced vibrations with a continuous wave coherent collimated beam of light emitted from a monochromatic light source [1];
   (b) receiving the light reflected from the optical reflector [6] of step (a) on a surface of a photo detector [8];
   (c) generating the optical diffraction pattern by the photo detector [8] comprising an inner active sensing area [10] and an opaque annular ring in the outer rim [9] to generate a photoelectric signal; and
   (d) transmitting the photoelectric signal of step (c) to the inner active sensing area [10] comprising analogue signal to digital signal conversion circuitry [16] as an input signal.

9. The method as claimed in claim 8, wherein the photo detector [8] is arranged in a configuration so that the reflected light beam is made to fall partially on the active sensing area [10] of the photo detector, and partially on the outer perimeter [9] of the active sensing area.

10. The method as claimed in claim 8, wherein a standard test and measurements apparatus [14] comprising analogue signal to digital signal conversion circuitry is connected to a computer [18], another standard test and measurements apparatus [16] comprising analogue signal to digital signal conversion circuitry is connected to the computer [18] or both the standard test and measurements apparatus [14] and the standard test and measurements apparatus [16] are connected to the computer [18].

11. The method as claimed in claim 8, wherein the induced vibrations introduced to the optical reflecting surface are reproduced from output signals emanating from the photo detector.

12. The method as claimed in claim 8, wherein the laser light modulations are converted into electrical modulations at the photo detector.

13. The method as claimed in claim 8, wherein the modulated electrical signal is converted back to an acoustical signal by the second loud speaker.

14. The method of claim 8, wherein the vibrations are sound vibrations.

15. A method for detecting vibrations by generation of an optical diffraction pattern, wherein the method comprises the step of:
   (a) illuminating an optical reflector [6] undergoing induced vibrations with a continuous wave coherent collimated beam of light emitted from a continuous wave content coherent collimated beam of light source [1];
   (b) receiving the light reflected from the optical reflector [6] of step (a) a surface of a photo detector [8];
   (c) generating the optical diffraction pattern by the photo detector [8] comprising an inner active sensing area [10] and an opaque annular ring in the outer rim [9] to generate a photoelectric signal; and
   (d) transmitting the photo electric signal of step (c) to the inner active sensing area [10] comprising analogue signal to digital signal conversion circuitry [16] as an input signal.

* * * * *